United States Patent
Lutz et al.

(10) Patent No.: US 6,449,550 B1
(45) Date of Patent: Sep. 10, 2002

(54) METHOD FOR MOTOR REDUCTION WHILE CLOSING THE BRIDGING CLUTCH OF AN AUTOMATIC TRANSMISSION FOR VEHICLES

(75) Inventors: Otto Lutz, Meersburg; Franz Sorg, Langenargen; Peter Muschel, Friedrichshafen; Roland Leibinger, Markdorf, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/650,019

(22) Filed: Aug. 28, 2000

(30) Foreign Application Priority Data

Oct. 12, 1999 (DE) .......................... 199 49 118

(51) Int. Cl.⁷ .......................... F16H 63/50; B60K 41/02
(52) U.S. Cl. ............................. 701/67; 701/64; 477/176
(58) Field of Search ............................. 701/67, 54, 62, 701/64, 66; 477/176, 169, 174

(56) References Cited

U.S. PATENT DOCUMENTS

| | | | |
|---|---|---|---|
| 5,211,680 A | * | 5/1993 | Sumimoto et al. ............. 74/858 |
| 5,580,334 A | * | 12/1996 | Minowa et al. ............. 477/168 |
| 5,755,638 A | * | 5/1998 | Suzuki ........................ 477/62 |

FOREIGN PATENT DOCUMENTS

| | | |
|---|---|---|
| DE | 195 13 695 A1 | 10/1996 |
| DE | 44 27 359 C2 | 6/1998 |

* cited by examiner

*Primary Examiner*—Tan Nguyen
(74) *Attorney, Agent, or Firm*—Davis & Bujold, P.L.L.C.

(57) ABSTRACT

Within the scope of the method for motor reduction while closing the lock-up clutch for automatic transmission of a motor vehicle, the starting value of the motor reduction is brought up via an adjustable ramp within the time period elapsed while laying on the disks of the lock-up bridge clutch, the motor reduction being adjustable with reference to a characteristic field.

14 Claims, 2 Drawing Sheets

METHOD FOR MOTOR REDUCTION WHILE CLOSING THE BRIDGING CLUTCH OF AN AUTOMATIC TRANSMISSION FOR VEHICLES

The invention relates to a method for motor reduction while closing the lock-up clutch for an automatic transmission of a motor vehicle.

BACKGROUND OF THE INVENTION

According to the prior art an automatic transmission contains a hydrodynamic converter with a lock-up bridge clutch, at least one planetary gear set and two shiftable frictional-engagement connections, in the form of a friction clutch and transmission brake, which serve to transmit the torque.

By virtue of hydrodynamic torque transmission in the converter, the rotational speeds of the input (e.g. motor) and turbine can assume different values. According to the prior art, another function of the converter is to attenuate awkwardnesses of the motor.

A motor reduction, according to the prior art, is introduced while closing the lock-up bridge clutch. The motor power is reduced to a fixed value.

This procedure results in an engagement jerk when employing the disks of the lock-up bridge clutch. In addition, at the end of the slipping phase of the lock-up bridge clutch, an engagement jerk is also produced which causes a ringing of the drive line.

One other undesired effect is a clear torque excess on the output during the whole operation, i.e. up to the end of the slipping phase.

Therefore, the problem on which this invention is based is to outline, for motor reduction while closing the lock-up bridge clutch, a method which overcomes the undesired effects of the former procedure. The disc employment operation in particular must develop without engagement jerk and a torque excess on the output must be prevented.

SUMMARY OF THE INVENTION

Accordingly, it is proposed to bring up the starting value of the motor reduction via an adjustable ramp in the period of time when the disks of the lock-up clutch are being employed.

In addition, the motor reduction can be adjusted with reference to a characteristic field. A preferred manner is to store in the characteristic field the amount of the motor reduction via the measured rotational speed ratio n_ue with n_ue=n_turbine/n_pump. The controller principle corresponds to a characteristic field controller whereby an optimized motor reduction is ensured.

The motor reduction automatically terminates by measuring the variable n_ue so that at the end of the slipping phase the torque connection is optimized. For n_ue=1, the motor reduction is terminated.

With the solution proposed, the gear shift is optimized so that no engagement jerk is produced. This is obtained by the fact that the torque excess on the output is to a great extent compensated by the motor reduction.

In addition, the load of the disks of the lock-up bridge clutch is reduced by the motor reduction without negative effect upon the output torque.

BRIEF DESCRIPTION OF THE DRAWINGS

The invention is explained in detail below with reference to the enclosed drawings wherein.

DESCRIPTION OF THE PREFERRED EMBODIMENTS

Figure 1:
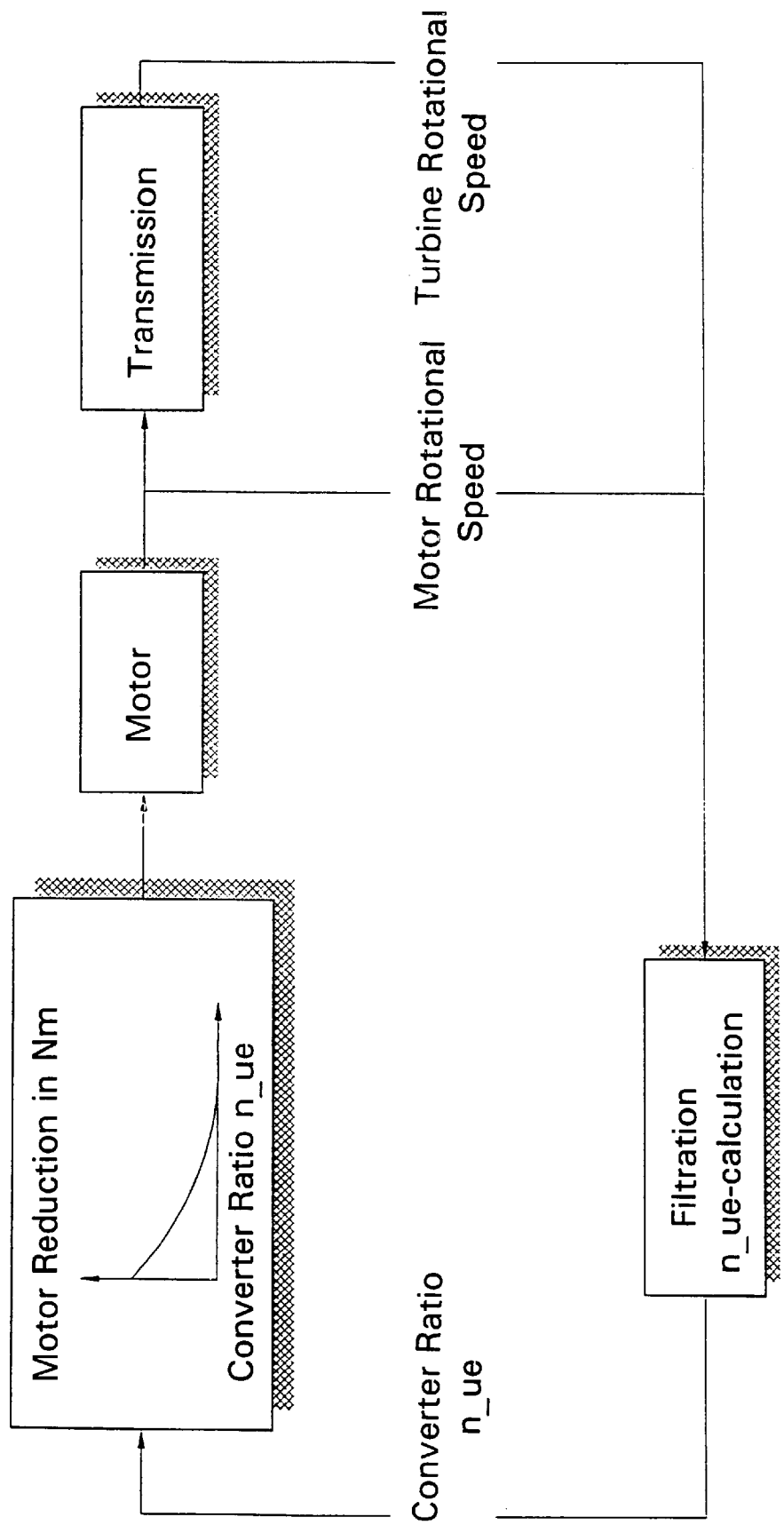
FIG. 1 diagrammatically shows the method, according to the invention, for motor reduction while closing the lock-up bridge clutch.

According to FIG. 1, with reference to a characteristic field, the motor reduction is determined from the calculation of the variable n_ue=n_turbine/n_pump. The amount of the motor reduction as function of the measured rotational speed ratio n_ue is stored in the characteristic field with n_ue=n_turbine/n_pump. The higher the value of n_ue, the lower the amount of motor reduction.

The motor torque signal is then passed on to the motor electronics and, accordingly, also the rotational speed of the motor. The values for motor and turbine rotational speeds are continuously detected and used to calculate n_ue.

Figure 2A:
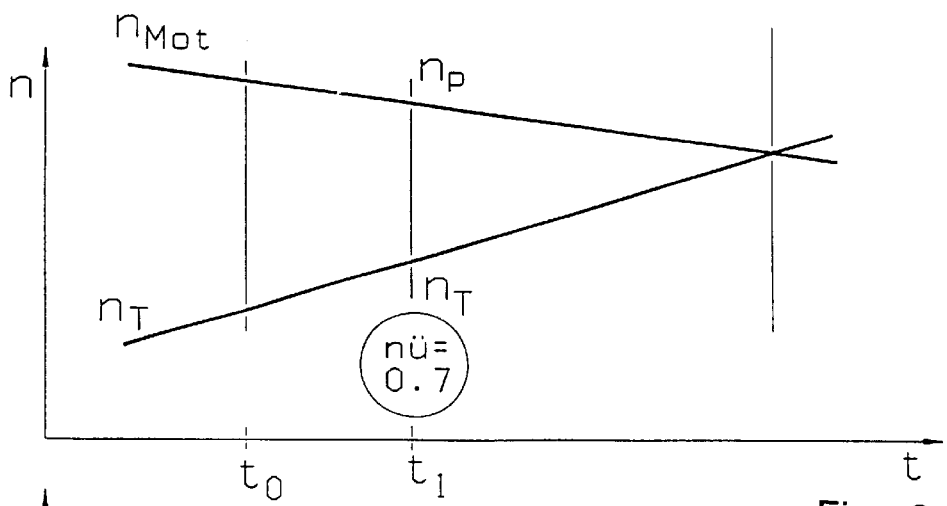
FIG. 2 shows a diagram of the gear shift operation, according to the invention.

In FIG. 2a, the motor rotational speed n_Mot and turbine rotational speed n_T are plotted according to the time elapsed during the shifting operation.

Figure 2B:
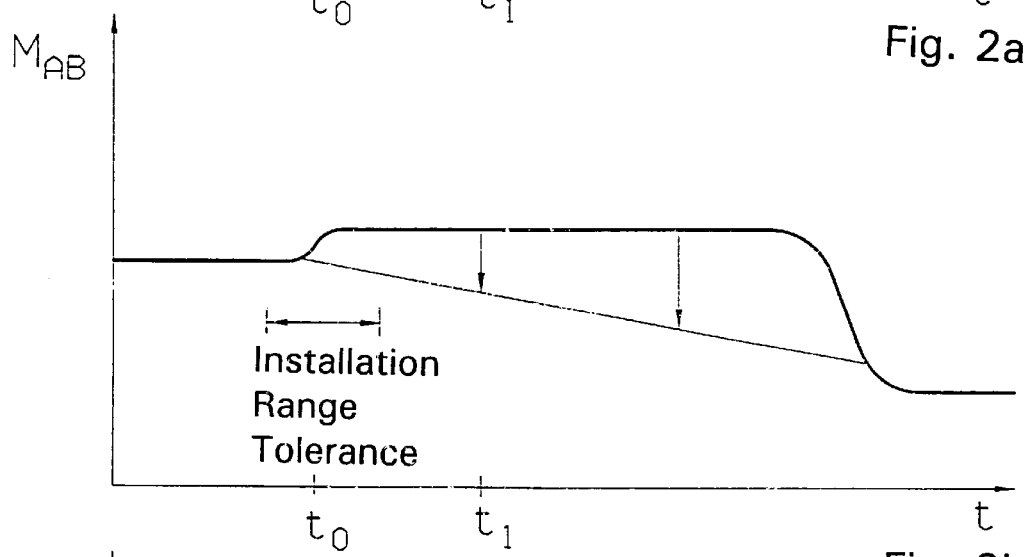
Figure 2C:
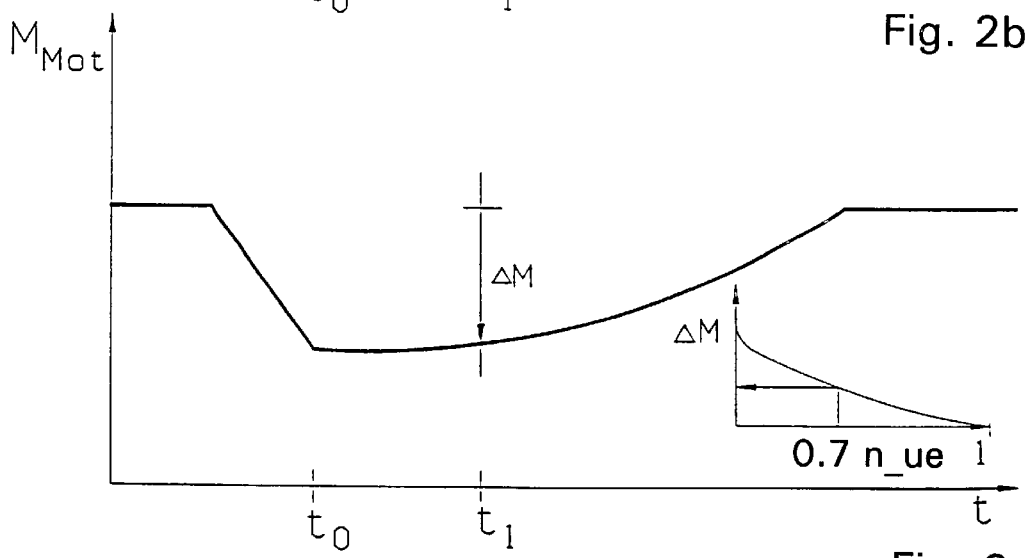

On the other hand, FIGS. 2b and 2c, respectively, show the output torque and the motor torque according to the time elapsed during the shifting operation. FIG. 2c also shows the characteristic field for motor reduction, i.e. the ratio ΔM to n_ue is integrated.

In all three Figures, the times t_0 and t_1 were taken into account. According to the invention, at time t_0, the shifting operation is introduced and the motor reduction is then carried out. Thus, at time t_1, the value of n_ue amounts to 0.7. Thereafter, understood from FIG. 2c, the motor torque is reduced by ΔM according to the characteristic field.

As shown in FIG. 2b, the torque excess on the output is at the same time compensated to a great extent.

The motor reduction is automatically terminated by measuring the variable n_ue so that at the end of the slipping phase the torque connection has been optimized.

What is claimed is:

1. A method of regulating an engine speed reduction of a motor vehicle engine during engagement of an automatic transmission lock-up bridge clutch for reducing a shifting shock occurring during engagement of the lock-up bridge clutch, the method comprising the steps of:

initiating engagement of the automatic transmission lock-up bridge clutch by commencing engagement of a disk set of the automatic transmission lockup bridge clutch;

controlling, during engagement of the disk set of the automatic transmission lockup bridge clutch, an engine speed reduction based on a variable ramp function, with the engine speed reduction determined from a characteristic field;

and terminating the control of the engine speed reduction upon complete engagement of the lock-up bridge clutch.

2. The method of regulating the engine speed reduction according to claim 1, further comprising the steps of:

determining a value of the engine speed reduction by detecting a motor rotational speed and a turbine rotational speed;

storing the determined engine speed reduction value in the characteristic field; and selecting one of the store engine speed reduction values from the characteristic field for controlling the engine speed reduction.

3. The method of regulating the engine speed reduction according to claim 1, further comprising the steps of:
   measuring a speed of a turbine n_turbine of the automatic transmission;
   measuring a pump speed n_pump of the automatic transmission;
   determining the engine speed reduction value based on a measured rotational speed ratio n_ue calculated from a ratio of the speed of the turbine n_turbine relative to the speed of the pump n_pump, using an equation of:

$$n\_ue = n\_turbine/n\_pump.$$

4. The method of regulating the engine speed reduction according to claim 3, further comprising the step of controlling the motor vehicle engine, during engagement of an automatic transmission lock-up bridge clutch, to optimize the engine speed reduction of the motor vehicle engine.

5. The method of regulating the engine speed reduction according to claim 1, further comprising the step of automatically terminating the engine speed reduction when the measured rotational speed ratio (n_ue) equals a value of one.

6. A method of regulating an engine speed reduction of a motor vehicle engine during engagement of an automatic transmission lock-up bridge clutch for reducing a shifting shock occurring during engagement of the lock-up bridge clutch, the method comprising the steps of:
   determining a value of the engine speed reduction by detecting a motor rotational speed and a turbine rotational speed;
   storing the determined engine speed reduction value in a characteristic field;
   initiating engagement of the automatic transmission lock-up bridge clutch by commencing engagement of a disk set of the automatic transmission lockup bridge clutch;
   controlling, during engagement of the disk set of the automatic transmission lockup bridge clutch, an engine speed reduction based on a variable ramp function, with a value of the engine speed reduction determined from the characteristic field;
   and terminating the control of the engine speed reduction upon complete engagement of the lock-up bridge clutch.

7. The method of regulating the engine speed reduction according to claim 6, further comprising the steps of:
   measuring a speed of a turbine n_turbine of the automatic transmission;
   measuring a pump speed n_pump of the automatic transmission;
   determining the value of the engine speed reduction based on a measured rotational speed ratio n_ue calculated from a ratio of the speed of the turbine n_turbine relative to the speed of the pump n_pump, using an equation of:

$$n\_ue = n\_turbine/n\_pump.$$

8. The method of regulating the engine speed reduction according to claim 7, further comprising the step of controlling the motor vehicle engine, during engagement of an automatic transmission lock-up bridge clutch, to optimize the engine speed reduction of the motor vehicle engine.

9. The method of regulating the engine speed reduction according to claim 6, further comprising the step of automatically terminating the engine speed reduction when the measured rotational speed ratio (n_ue) equals a value of one.

10. A method of regulating an engine speed reduction of a motor vehicle engine during engagement of an automatic transmission lock-up bridge clutch for reducing a shifting shock occurring during engagement of the lock-up bridge clutch, the method comprising the steps of:
    initiating engagement of the automatic transmission lock-up bridge clutch by commencing engagement of a disk set of the automatic transmission lock-up bridge clutch;
    reducing the engine speed based on a variable ramp function during a period of time when a disk set of the automatic transmission lockup bridge clutch are operative, with the reduction of the engine speed based upon a characteristic field; and
    terminating the reduction of the engine speed upon complete engagement of the lock-up bridge clutch.

11. The method of regulating the engine speed reduction according to claim 10, further comprising the steps of:
    measuring a speed of a turbine n_turbine of the automatic transmission;
    measuring a pump speed n_pump of the automatic transmission;
    determining a value of the engine speed reduction based on a measured rotational speed ratio n_ue calculated from a ratio of the speed of the turbine n_turbine relative to the speed of the pump n_pump, using an equation of:

$$n\_ue = n\_turbine/n\_pump.$$

12. The method of regulating the engine speed reduction according to claim 11, further comprising the step of controlling the motor vehicle engine, during engagement of an automatic transmission lock-up bridge clutch, to optimize the engine speed reduction of the motor vehicle engine.

13. The method of regulating the engine speed reduction according to claim 11, further comprising the step of automatically terminating the engine speed reduction when the measured rotational speed ratio (n_ue) equals a value of one.

14. The method of regulating the engine speed reduction according to claim 10, further comprising the step of automatically terminating the engine speed reduction when the measured rotational speed ratio (n_ue) equals a value of one.

* * * * *